(12) United States Patent
Shen (10) Patent No.: US 9,091,423 B2
(45) Date of Patent: Jul. 28, 2015

(54) LED STREET LAMP BASE (75) Inventor: Jinxiang Shen, Zhejiang (CN)

(73) Assignee: SENGLED OPTOELECTRONICS CO., LTD., Tongxiang, Zhejiang (CN)

( * ) Notice: Subject to any disclaimer, the term of this patent is extended or adjusted under 35 U.S.C. 154(b) by 376 days.

(21) Appl. No.: 13/522,178

(22) PCT Filed: Sep. 19, 2010

(86) PCT No.: PCT/CN2010/077102
§ 371 (c)(1),
(2), (4) Date: Jul. 13, 2012

(87) PCT Pub. No.: WO2011/085597
PCT Pub. Date: Jul. 21, 2011

(65) Prior Publication Data
US 2013/0148340 A1  Jun. 13, 2013

(30) Foreign Application Priority Data

Jan. 14, 2010 (CN) .......................... 2010 1 0039754

(51) Int. Cl.
*F21S 4/00* (2006.01)
*F21V 21/00* (2006.01)
*F21L 4/02* (2006.01)
*F21V 33/00* (2006.01)
*F21V 21/26* (2006.01)
*B60Q 1/06* (2006.01)
*F21V 29/00* (2006.01)
*F21S 8/00* (2006.01)
(Continued)

(52) U.S. Cl.
CPC . *F21V 21/14* (2013.01); *F21L 4/02* (2013.01); *F21S 8/086* (2013.01); *F21V 19/02* (2013.01); *F21V 21/30* (2013.01); *F21K 9/30* (2013.01); *F21S 2/005* (2013.01); *F21V 15/015* (2013.01); *F21V 23/002* (2013.01); *F21V 29/507* (2015.01); *F21V 29/763* (2015.01); *F21V 29/83* (2015.01); *F21W 2131/103* (2013.01); *F21Y 2101/02* (2013.01); *Y02B 20/72* (2013.01)

(58) Field of Classification Search
CPC ............ F21V 19/02; F21V 21/30; F21L 4/02; F21S 2/005; F21W 2131/103; F21K 9/17; F21K 9/175
USPC ................. 362/373, 184, 269, 249.1, 249.02, 362/249.03, 217.08, 217.12, 217.16, 431
See application file for complete search history.

(56) References Cited

U.S. PATENT DOCUMENTS

2010/0289428 A1* 11/2010 Frazier et al. ................. 315/294
2011/0032696 A1* 2/2011 Kim et al. ..................... 362/184
(Continued)

*Primary Examiner* — Peggy Neils
*Assistant Examiner* — William N Harris
(74) *Attorney, Agent, or Firm* — Tianhua Gu; Global IP Service (57) ABSTRACT

A LED street lamp comprises a power source box at front section, a lamp holder at middle section and an end cap at end section. The lamp holder includes a turn-able framework, a frame fixing unit connected with frame to limit frame rotation and a several LED lighting modules installed side by side in the frame. A LED lighting module is turn-able to connect with the frame on which a module positioning unit is set to limit the rotation of LED lighting module. The LED street lamp base includes two bilateral symmetrical frames, each of which is set with several LED lighting modules side by side. Both angles of frame and LED lighting module are adjustable, therefore, the LED street lamp can be adjusted at any time according to practical street situation in order to ensure ideal street lighting brightness and evenness.

12 Claims, 9 Drawing Sheets

(51) Int. Cl.
  *F21V 21/14* (2006.01)
  *F21S 8/08* (2006.01)
  *F21V 19/02* (2006.01)
  *F21V 21/30* (2006.01)
  *F21S 2/00* (2006.01)
  *F21W 131/103* (2006.01)
  *F21Y 101/02* (2006.01)
  *F21V 23/00* (2015.01)
  *F21K 99/00* (2010.01)
  *F21V 15/015* (2006.01)
  *F21V 29/507* (2015.01)
  *F21V 29/76* (2015.01)
  *F21V 29/83* (2015.01)

(56) References Cited

U.S. PATENT DOCUMENTS

2011/0038145 A1* 2/2011 Davenport et al. ............ 362/218
2011/0063832 A1* 3/2011 Hu et al. ........................ 362/235
2012/0300460 A1* 11/2012 Liu et al. .................. 362/249.02

* cited by examiner

LED STREET LAMP BASE

CROSS REFERENCE TO RELATED PATENT APPLICATION

The present application is the US national stage of PCT/CN2010/077102 filed on Sep. 19, 2010, which claims the priority of the Chinese patent application No. 201010039754.X filed on Jan. 14, 2010, which application is incorporated herein by reference.

FIELD OF THE INVENTION

The present invention generally relates to street lighting, especially a framework for fixing a LED lighting module and a street lamp base of which the angle of LED lighting module is adjustable.

BACKGROUND OF THE INVENTION

The LED street lamp has many advantages, such as long service life, strong penetration ability for mist, energy saving.

However, the LED has shortage in optical performance, if the LED light source is used for a LED street lamp the light distribution must be considered according to different street lighting situation and the lighting direction of each group of LED must be designed differently to gain an overall lighting effect for different areas of the street. Which brings difficulties for a large number manufacture of the LED street lamps.

SUMMARY OF THE INVENTION

The present invention provides a LED street lamp base in which the lighting angle can be adjusted according to the street situation.

A LED street lamp base comprises a power source box at front section, a lamp holder at middle section and an end cap at end section. The lamp holder has a turn-able framework, a frame fixing unit is connected with a frame to limit the frame rotation, several LED lighting modules are installed side by side in the frame. A LED lighting module is turn-able to connect with the frame, on the frame a module positioning unit is fixed to limit the rotation of the LED lighting module.

As a best embodiment, the lamp holder has two frames which are symmetrical along a central line of the lamp holder and a connecting piece used to connect the two frames; the front and back ends of the connecting piece are fixed and connected respectively with the power source box and the end cap, the inside of the frame is turn-able to connect with the connecting piece and the outside of the frame is connected to the frame positioning unit.

As another embodiment, the frame includes a left side plate, a right side plate, as well as a front side plate and a back side plate used to connect left and right side plates respectively. Both ends of the LED lighting module is turn-able to connect with the left and right side plates. Several axle holes are set on a same line to mount LED lighting modules while several lead holes are set on the right side plate corresponding to the axle holes on left side plate for leads going through. The right side plate is of arc shape. The top and bottom ends of the front side plate near the joint with the right side plate have grooves respectively, the back side plate also has grooves which are the same as the front side plate. The connecting piece is a hollow section bar including a sub-plate, two support plates being at both ends of the sub-plate, the support plates corresponding to the right side plate of frame and are used to support right side plate and enable it to turn in support plate holes matching with the lead holes on the right side plate of frame are set on the support plate. The subplate and two support plates form a cavity to hold leads. The top and bottom ends of the support plate have positioning slots along their length direction respectively, a support rod is in the positioning slot, two ends of the support rod are respectively connected with the power source box and end cap. The width and depth of the grooves on the front and back side plates determine the turning angle of the right side plate of frame.

As another embodiment, the right end of LED lighting module is set with a bulb, from which leads are drawn out. The left end of the LED lighting module is fixed with a circular ring, the top and bottom ends of the circular ring on are respectively set with a elastic convex tooth to connect the module positioning unit. The bulb can be turned freely to meet the demand of turning LED lighting module in circumference direction and positioning the lighting module after turning with the help of the module positioning unit.

As another embodiment, the module positioning unit includes a clamp ring, that is set on the circular ring, there is a ledge in middle part of the clamp ring, a spindle nose is set on the middle part of the ledge and is inserted into the axle hole of left side plate. The up and down ends of inner surface of the clamp ring are respectively set with a row of internal teeth; elastic convex teeth are geared with the internal teeth. The clamp ring is connected with the left side plate through a slide block and sliding rail, the periphery of clamp ring is fixed on left side plate, when a big stress is acted between the elastic convex teeth and internal teeth, the elastic convex teeth can slide relative to the internal teeth. The LED lighting module is inserted in the clamp ring through the circular ring, the elastic convex teeth on the outer circumference of the circular ring is geared with the internal teeth on inner circumference of the clamp ring. To adjust lighting angle of a single LED lighting module, the LED lighting module can be turned to make the elastic convex teeth to slide with the internal teeth from one tooth slot to another one; when the angle is adjusted well, stop turning and the elastic convex teeth will be locked in the tooth slot of the internal teeth, the LED lighting module will stop at a corresponding position. For another adjustment, the above mentioned operations can be repeated. At initial situation, the clamp ring is mounted one by one on the left side plate, and then slid to corresponding position, and then insert the circular ring of the LED lighting module into the internal circumference of the clamp ring for preventing the circular ring being inserted too deep resulting in poor touch between convex teeth and internal teeth. The Ledge is set in middle part of the clamp ring to limit the displacement of circular ring, the ledge has a spindle nose that is inserted in the axle hole on left side plate in order to in favor of the LED lighting module turning smoothly and to limit the clamp ring in corresponding position so as to prevent it sliding on the left side plate.

As another embodiment, the up and down ends of the clamp ring are set with sliding plates parallel to each other on which raised slide block is set; a cavity in the internal side of left side plate holds the clamp ring, the cavity has two slide rails on its up and down ends respectively, the slide block is inserted in the slide rail. Two parallel sliding plates are in touch with the up and down ends of cavity to prevent the clamp ring from circumferential turning, and the slide blocks prevent the clamp ring dropping from cavity.

For better supporting the bulb and enabling the bulb turning freely, as another embodiment, the top and bottom edges of right side plate have arc grooves to hold bulbs and enable bulbs turning in it. The Bulb of LED lighting module is set in the arc groove. As another embodiment, the LED lighting module includes a radiator unit and a heat conduction subplate, the top surface of the subplate connects with the radiator unit and the bottom surface is set with print circuit and several LEDs. The circular ring and the bulb are respectively set on left and right end faces of the radiator unit. The LED lighting module includes several LEDs as a lighting tube, that is benefit for easy maintenance and replacement as well as good light concentration effect.

As another embodiment, the radiator unit includes a baseplate of which the bottom face is connected with the top face of heat conduction subplate and the top face is set with several fins vertically and side by side along the width direction of baseplate. As another embodiment, fins and the baseplate are of one piece, that is better for heat radiation.

As another embodiment, the elastic convex tooth and circular ring are of one piece, which is made of rubber material. Rubber is soft, the convex tooth can slide relative to internal tooth under big force.

As another embodiment, the frame positioning unit includes a frame positioning plate set on the outside of the frame, the top of the frame positioning plate is hinged with the power source box and end cap; the end face of frame positioning plate closing the frame is set with several parallel slots from up to down along horizontal direction, at least one strip matching with the slot is set on the end face of frame closing the frame positioning plate for locking the strip in the slot. At initial situation, the left side plate is in touch with the frame positioning plate and the strip is locked in the slot. When adjusting frame angle, turn over the frame positioning plate to release the strip away from the slot, and then turn the frame for certain angle, namely the right side plate is turned a certain angle in the support plate; when the angle is adjusted well, lay down the frame positioning plate to lock the strip into a corresponding slot so as to locate the frame.

As another embodiment, the frame includes the left side plate, right side plate, front and back side plates, the front and back side plates connect the left and right side plates respectively. The strip is set on the left side plate.

As another embodiment, the frame positioning plate has four parallel grooves from top to bottom and a strip is set on top end of the left side plate.

The LED street lamp base of the invention contains two symmetrical frames, each of which is set with several LED lighting modules side by side. The angles of the frame and the LED lighting module are adjustable. The LED street lamp can be adjusted according to practical street situation to ensure ideal street lighting brightness and evenness.

DETAILED DESCRIPTION OF THE INVENTION

As shown in FIG. 1~6, the LED street lamp base includes a power source box (27) at front section, a lamp holder (28) at middle section and an end cap (29) at end section. The Lamp holder (28) includes two frames (1) which is symmetrical along a central line of the lamp holder (28) and a connecting piece (39) for connecting two frames; the front and back ends of connecting piece (39) are respectively connected with the power source box (27) and end cap (29), the inside of frame (1) is turn-able to connect with the connecting piece (39); the outside of frame (1) is connected with the frame positioning unit to limit the frame from turning, several LED lighting module (2) are set side by side inside the frame; The LED lighting module (2) is turn-able to connect with the frame (1), a module positioning unit is set on the frame to limit the LED lighting module (2) from turning.

As shown in FIG. 2~5, the frame (1) consists of a left side plate (3), a right side plate (4) a front side plate (5) and a back side plate (6), the front and back side plate connect with the left and right side plates through screw; both ends of LED lighting module (2) is turn-able to connect with the left side (3) and right side plate (4); several axle holes (21) are set along a line on the left side plate for mounting the LED lighting module (2), several lead holes 11 are set of the right side plate (4) corresponding to axle holes (21) on left side plate (3) for passing the leads of LED lighting module through; the right side plate (4) is of arc shape, circular arc shape is preferred. Two grooves (30) are set on the end of the front side plat (5) near the joint with the right side plate (4), the back side plate (6) also has two grooves (30) which are the same as the front side plate (5).

The connecting piece (39) is a hollow device including a subplate (31) and two support plates (32) stood at both sides of the subplate (31), the support plate (32) have a same arc shape liking the right side plate (4), thereby the support plates (32) support the right side plate (4) of the frame in turn-able way. The support plate (32) has holes (33) corresponding to the lead holes of the right side plate of frame. The subplate (31) and two support plates (32) form a cavity to hold leads; both top and bottom ends of the support plate (32) have a positioning slot respectively along their length direction, a support rod (35) goes through it, two ends of the rod (35) respectively connected with the power source box (27) and the end cap (29). The end cap (29) is formed by several steel pipes and has holes for connecting the support rod.

The function of the grooves (30) is as follows: when turning the right side plate (4) in the support plate (32), the right side plate (4) will not be blocked by the top and bottom edges of support plate (32), and the turning angel of frame (1) can be adjusted by changing the width and depth of groove (30).

As shown in FIGS. 3, 4, 5, 11 and 12, the frame positioning unit includes a frame positioning plate (36) which is set on the outside of frame (1), the top of the frame positioning plate (36) is hinged with the power source box (27) and end cap (29); in detail, the top end of frame positioning plate (36) is connected with a positioning spindle (40), four parallel slots (37) are set from up to down on the contact face between the frame positioning plate (36) and left side plate (3) of frame, but the amount of slots is not limited to four and can be set according to practical situation; the bigger the amount, the finer the adjustment. Slots (37) are set along horizontal direction, a strip (38) matching with slot (37) is set on left side plate (3), when the strip (38) is inserted into slot (37), the frame (1) is locked.

Figure 11:
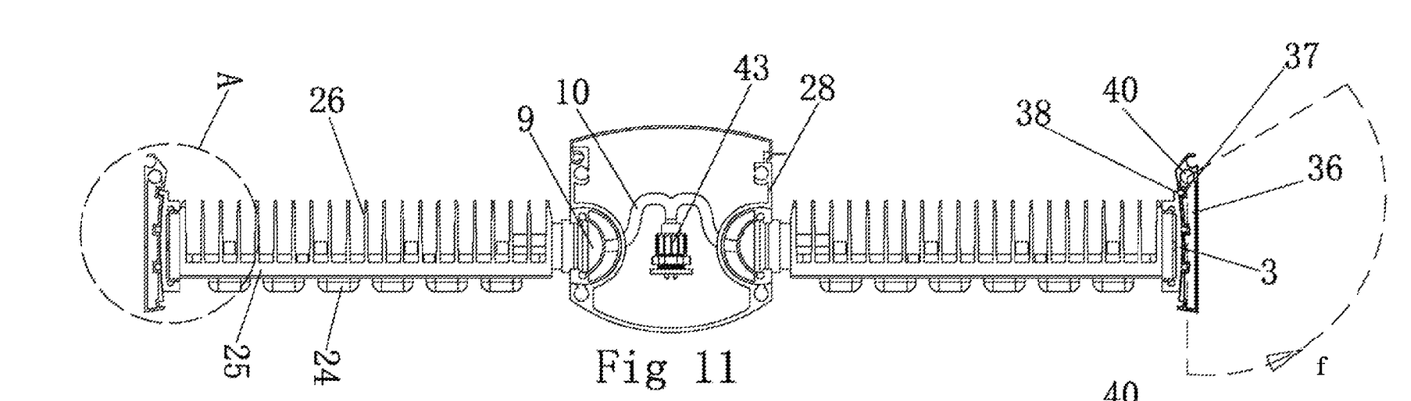
FIG. 11. A plan view of frame positioning plate before adjusting angle of frame.
Figure 12:
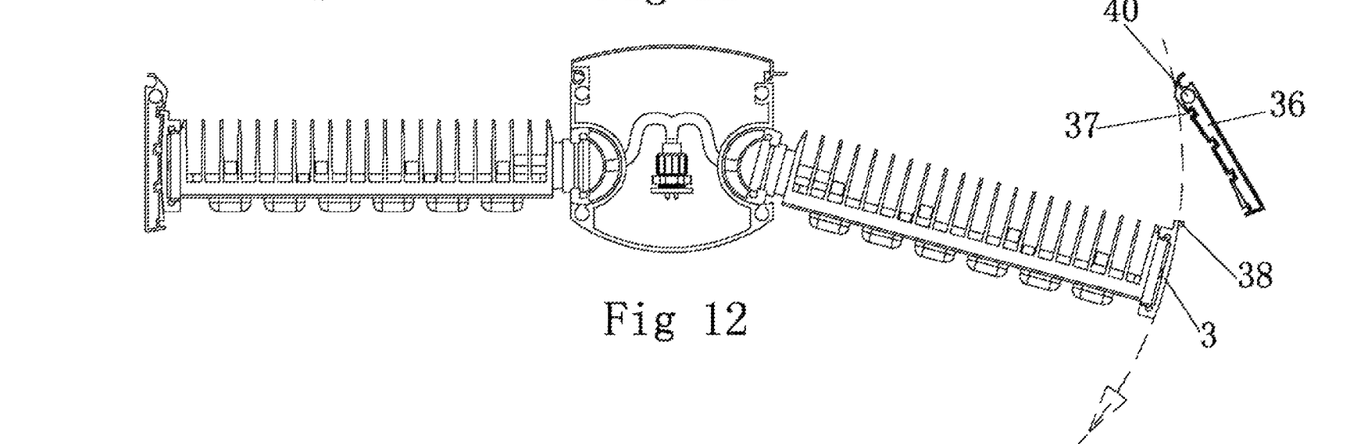
FIG. 12. A plan view of frame positioning plate, the frame is released from frame positioning plate.

As shown in FIGS. 11 and 12, for adjusting the angle of frame, release the strip (38) from the slot (37), then turn the frame along the direction of the arrow shown in FIG. 11 for certain angle, when angle is adjusted well, turn frame positioning plate (36) back to its initial position to lock the strip (38) in corresponding slot (37) to locate the frame. The adjustment is easy. After adjustment is finished, further fix the frame positioning plate (36), both ends of the frame positioning plate (36) have mounting holes (41), the screws (42) fix the frame positioning plate (36) on the end cap (29) and power source box (27).

Figure 7:
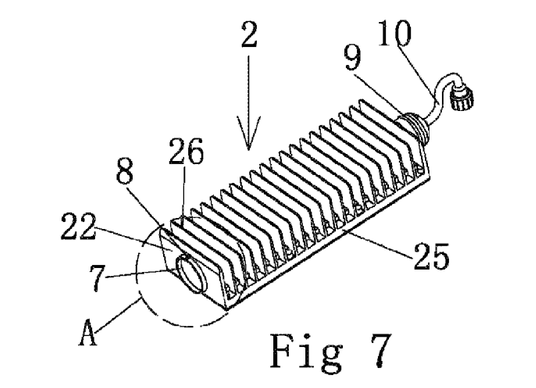
FIG. 7. A perspective view of the LED lighting module of the invention.
Figure 8:
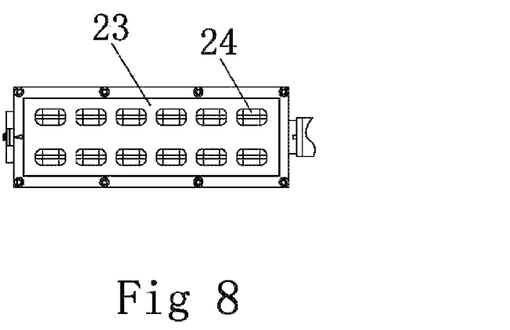
FIG. 8. A plan view of undersurface of LED lighting module.

As shown in FIGS. 7 and 8, the LED lighting module (2) consists of a radiator unit (22) and a heat conduction subplate (23), the top of which is connected with the radiator unit (22) and bottom of which has a print circuit and several LED lamps (24); for improving the light concentration effect of LED lamp (24), it is optional to set a lens on the outer cover of LED lamp (24); the radiator unit (22) includes baseplate (25), the top face of heat conduction subplate (23) is connected with bottom face of baseplate (25), several fins (26) are on the bottom face; the fins (26) are set along the width direction of baseplate (25) and all of them are vertical to baseplate (25); fins (26) and baseplate (25) are made of aluminum; in favor of heat radiation, the fins (26) and baseplate (25) are made of one piece.

Figure 9:
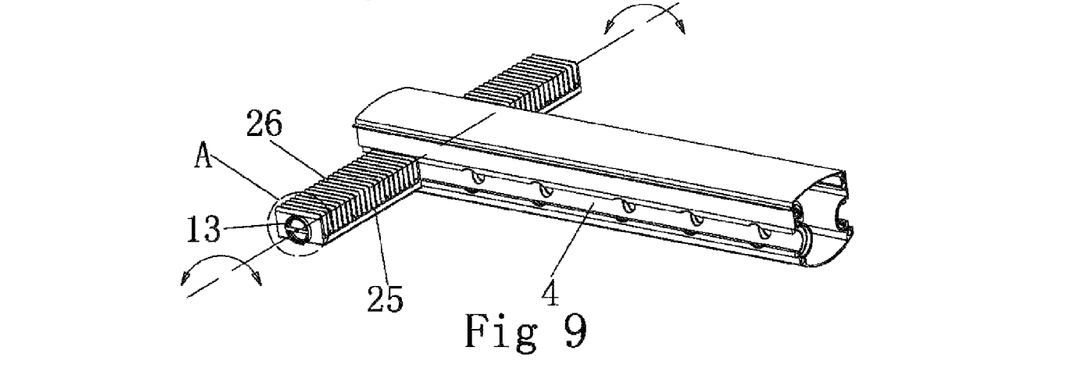
FIG. 9. A perspective view of LED lighting module and right side plate, connecting piece and clamp ring.
Figure 10:
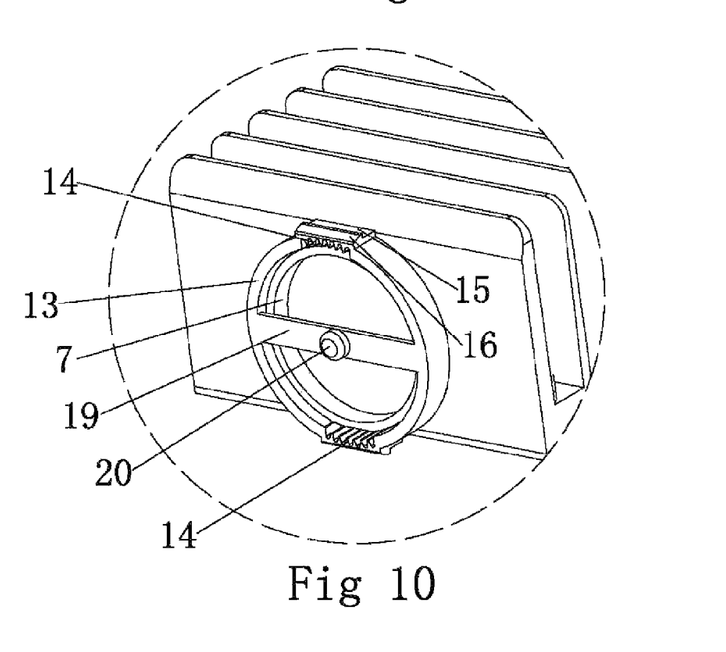
FIG. 10. An enlarged view of Part A in FIG. 9.
Figure 13:
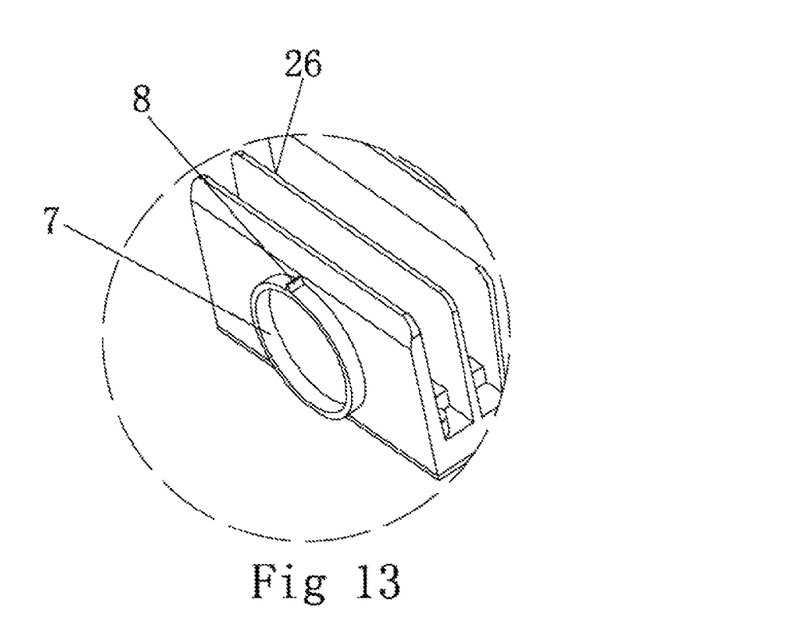
FIG. 13. An enlarged view of the Part A in FIG. 7.

As shown in FIGS. 7, 9 and 13, the fins (26) on both left and right ends of LED lighting module (2) are respectively set with a circular ring (7) and a bulb (9); the top and bottom ends of the circular ring (7) are respectively set with a elastic convex tooth (8) which is made of one piece with the circular ring (7) and both of them are made of rubber material; the circular ring (7) is connected with the module positioning unit; the lead (10) passes through the bulb (9) and connects with power sources of LED lamp (24). As shown in FIGS. 11 and 12, in left and right frames, leads (10) of two relative LED lighting modules (2) extends into the cavity of connecting piece (39) and are connected through a connector (43) which is connected with the power source box (27).

Arc slots (12) are set on both up and down edges of the right side plate (4) respectively in order to hold the bulb (9) and enable it to turn in the slot; bulb (9) of LED lighting module (2) is set in the arc slot (12) and lead (10) goes through the through-holes (11) and hole (33).

As shown in FIGS. 10, 11, 13 and 14, the module positioning unit includes a circular clamp ring (13) with an inner diameter which is the same as the outer diameter of the circular ring; there is a ledge (19) in middle part of clamp ring (13) and a spindle nose (20) is set on the middle part of ledge (19), the spindle nose (20) is inserted in the axle hole (21) on the left side plate (3); the up and down ends of inner surface of the clamp ring (13) are respectively set with a row of internal teeth (14); elastic convex teeth (8) are geared with the internal teeth (14); the clamp ring (13) is connected with left side plate (3) through the slide block and sliding rail, and the clamp ring (13) is fixed on left side plate (3); when big force is acted between the elastic convex teeth (8) and internal teeth (14), the elastic convex teeth (8) can slide relative to internal teeth (14).

Figure 14:
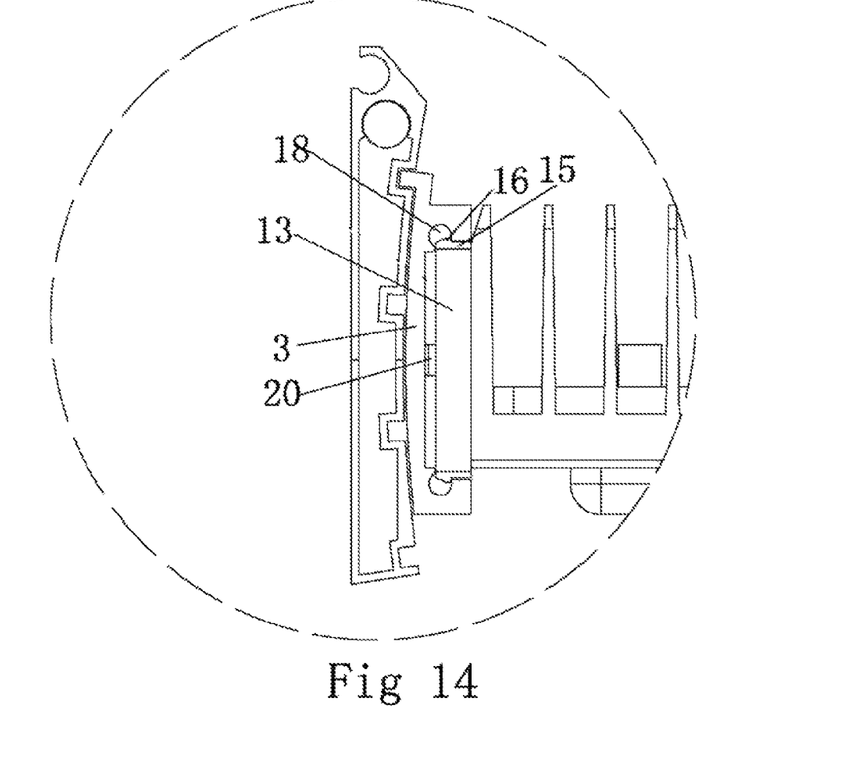
FIG. 14. An enlarged view of the Part A in FIG. 11.

As shown in FIGS. 11 and 14, the detailed structures of the slide block and sliding rail are as follows: the up and down ends of clamp ring (13) are set with sliding plates (15) parallel to each other, on which raised slide block (16) is set; the internal side of left side plate (3) is set with cavity to hold clamp ring (13), the up and down ends of the left side plate (3) are respectively set with a slide rail (18), in which the slide block (16) is set.

Figure 1:
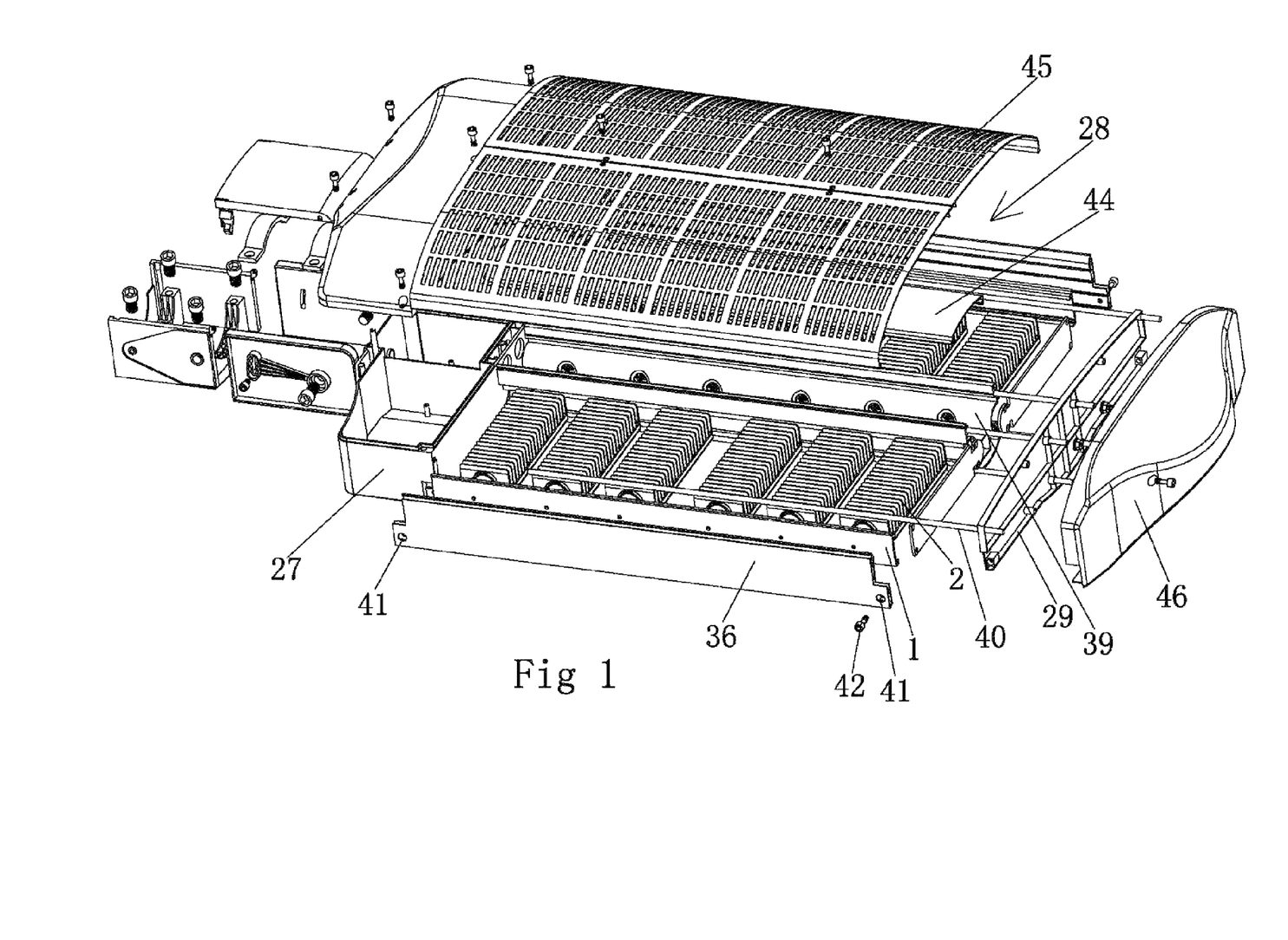
FIG. 1. An exploded view of the LED street lamp base of the invention.
Figure 2:
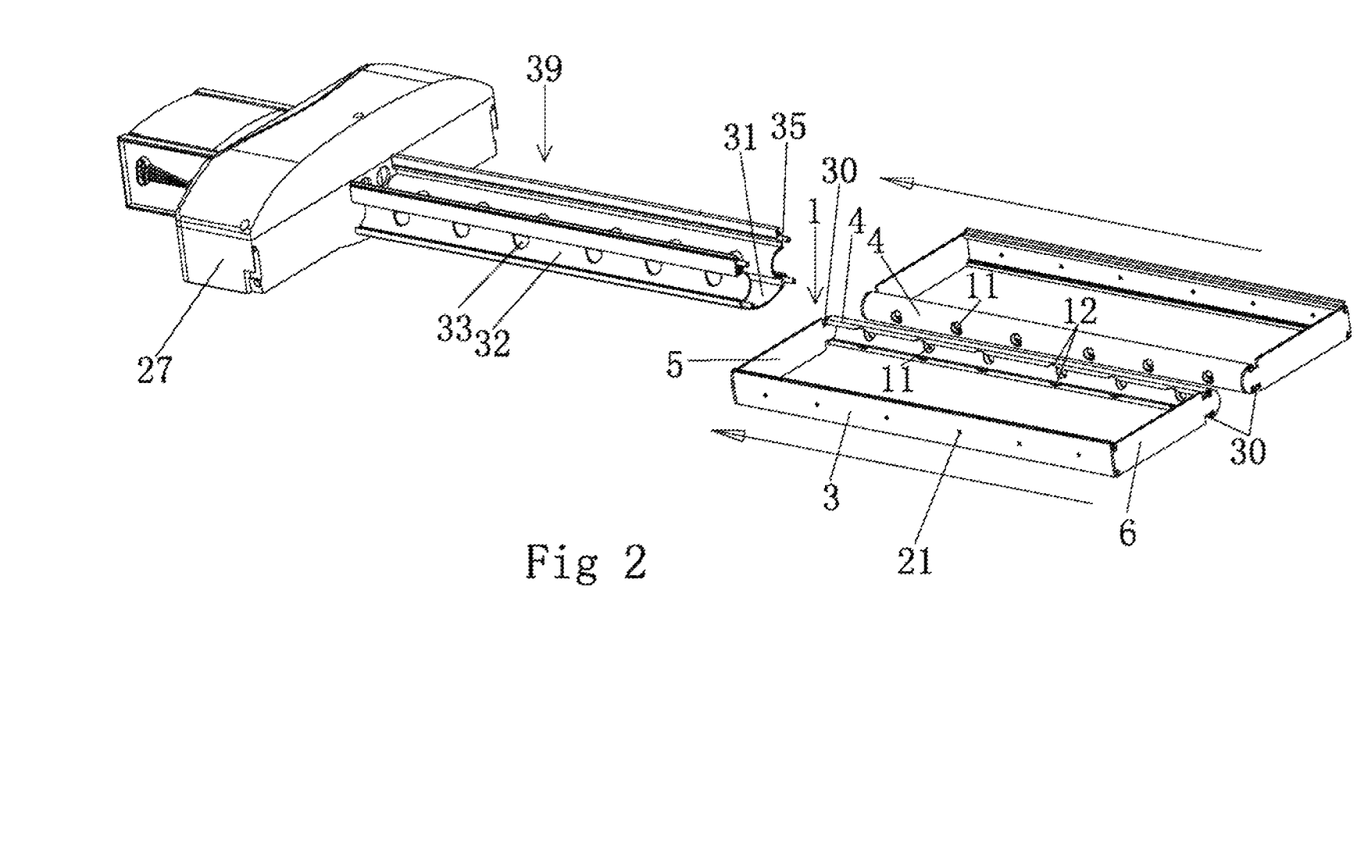
FIG. 2. An exploded view of the frame and connecting piece.
Figure 3:
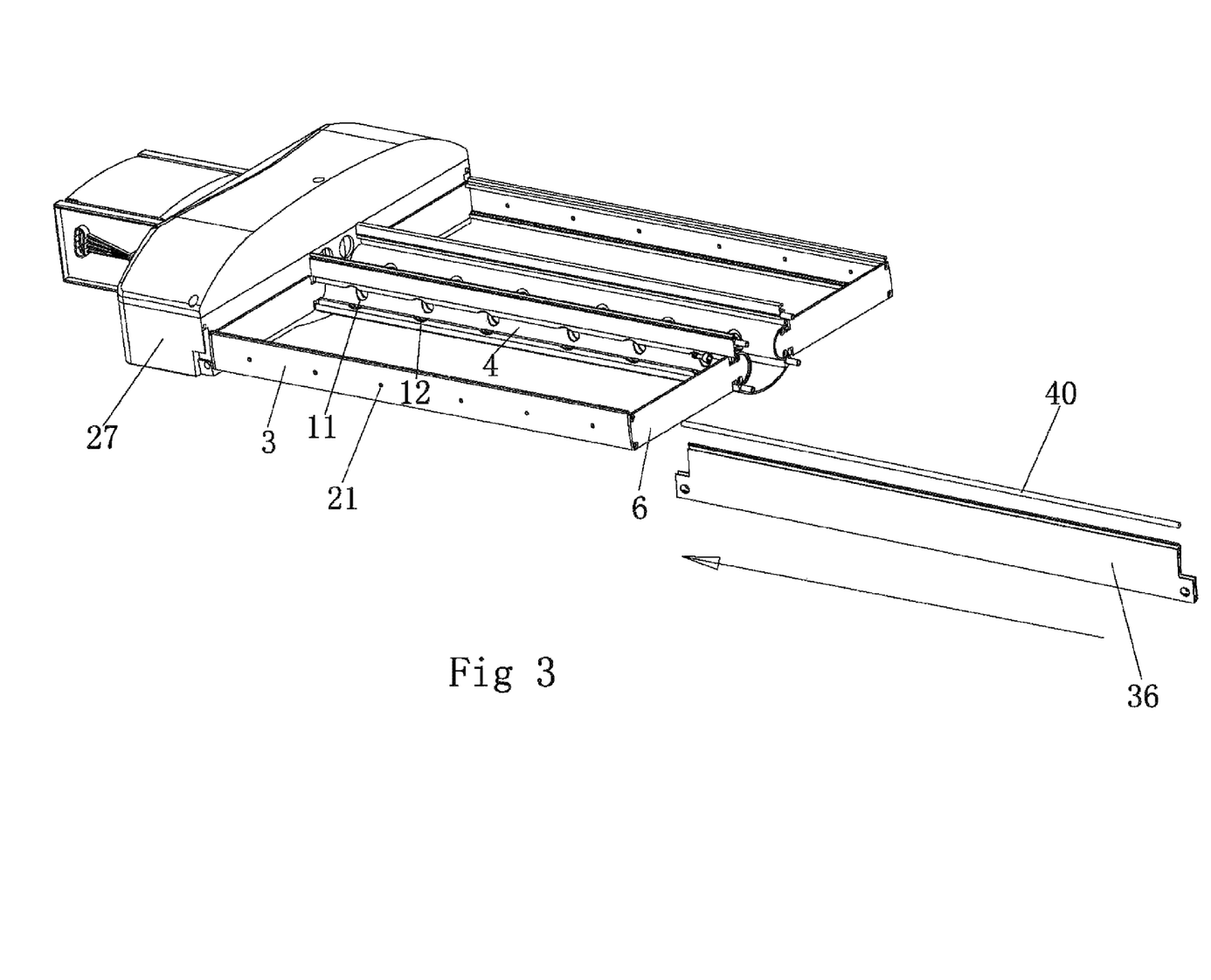
FIG. 3. An exploded view of the frame and frame positioning plate.
Figure 4:
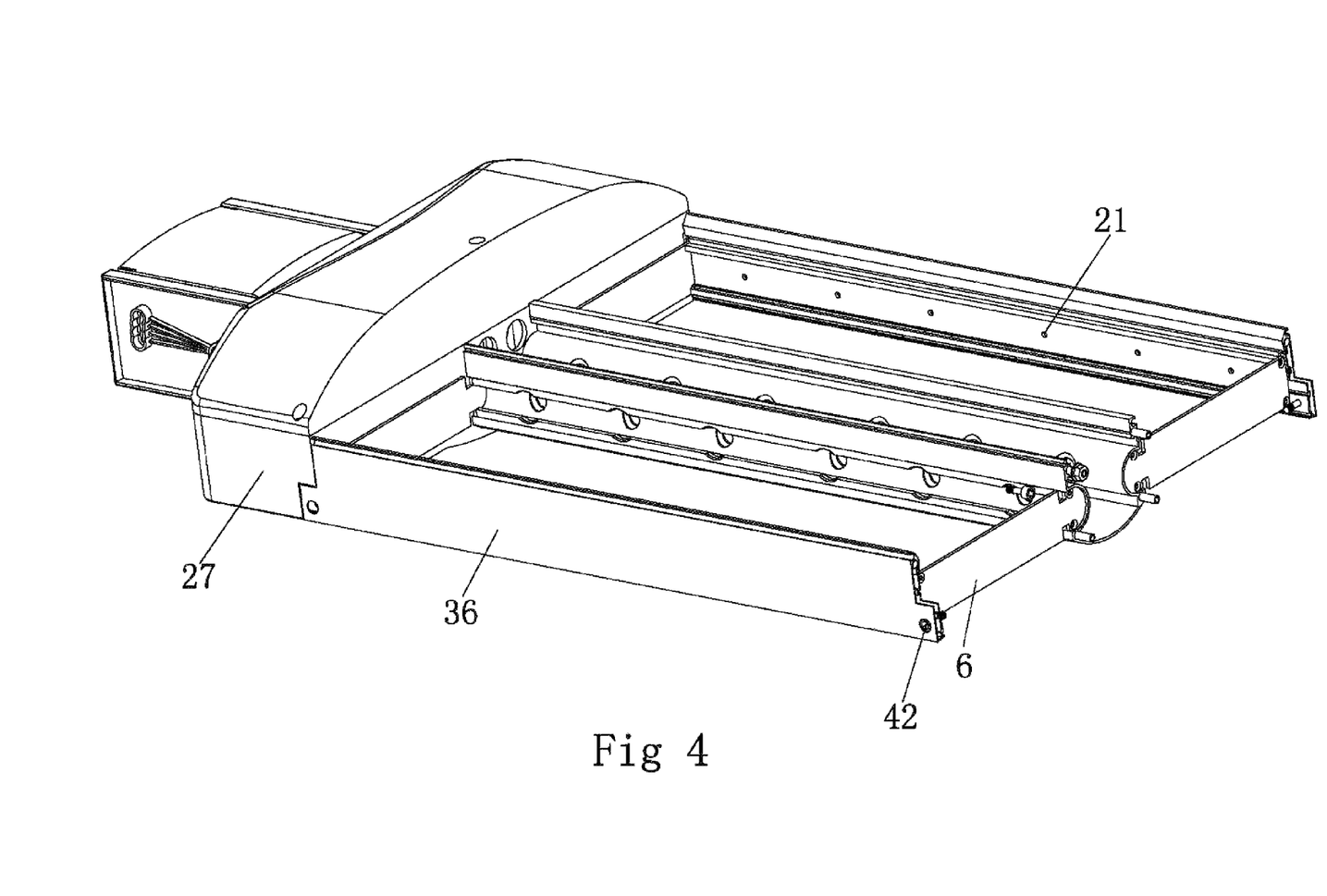
FIG. 4. A perspective view of the connecting piece, frame and frame positioning plate.
Figure 5:
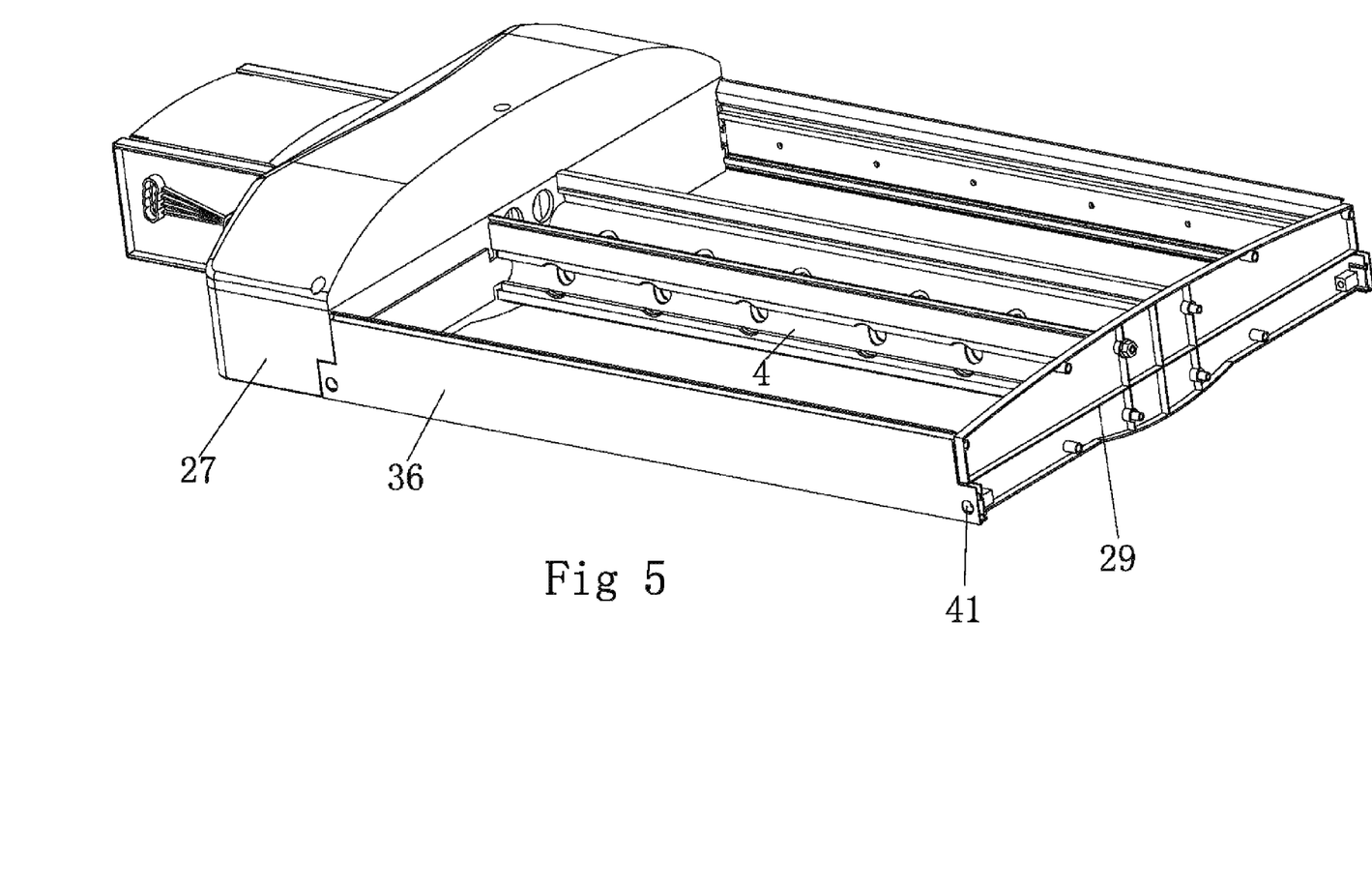
FIG. 5. A perspective view of the connecting piece, frame, frame positioning plate and end cap.
Figure 6:
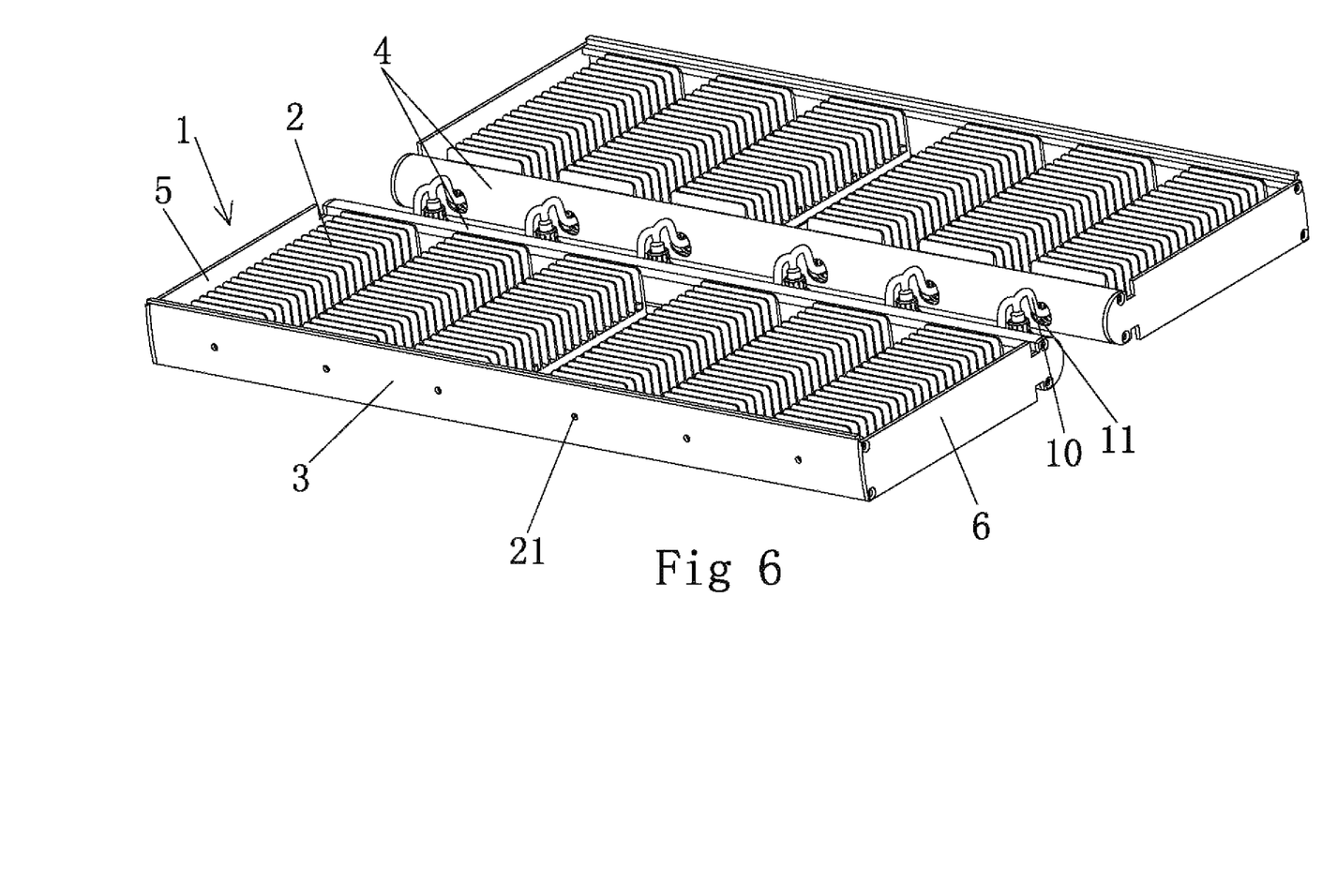
FIG. 6. A perspective view of the frame and LED lighting module.

As shown in FIG. 1, after the structure is assembled, a top caps (44) is on two support plates (32), shields (45) are on the frame (1) and connecting piece (39), and an end cap box 46 is on the outside of the end cap (29).

The invention claimed is:

1. A LED street lamp base comprising:
a power source box (27) at front section, a lamp holder (28) at middle section and an end cap (29) at end section, wherein the lamp holder (28) includes turnable frame (1) which is connected with a frame positioning unit to limit rotation of the frame (1), in the turn-able frame (1) a plurality of LED lighting modules (2) are set side by side, the LED lighting modules is turned to connect with the frame (1) on which a module positioning unit is mounted to limit the rotation of the LED lighting modules (2);
the lamp holder (28) consists of two symmetrical frames (1) and a connecting piece (39) for connecting the two frames (1); front and back ends of the connecting piece (39) are fixed respectively with the power source box (27) and the end cap (29), an inside of the frame (1) is turn-able to connect with the connecting piece (39), and an outside of the frame (1) is connected to the frame positioning unit;
the frame (1) consists of a left side plate (3), a right side plate (4), a front side plate (5) and a back side plate (6) connecting the left and the right side plates, both ends of the LED lighting module (2) are turn-able to connect with the left side plate (3) and the right side plate (4) respectively; a plurality of bearing holes (21) are set on a top edge of the left side plate (3) along a line to mount LED lighting modules (2) while a plurality of lead holes are set on the right side plate (4) corresponding to the bearing holes on the left side plate (3) for leads of LED lighting modules passing through, the right side plate (4) is of arc shape, the front side plate (5) has grooves (30) located on its top and bottom near a joint with the right side plate (4), the same as for the back side plate, the connecting piece (39) is a hollow section bar including a bottom plate (31) and two symmetrical support plates (32) at both sides therein, the support plates 32 have a shape matching with shape of the right side plate (4) and is turn-able to support the right side plate (4) thereon; holes (33) corresponding with the lead holes on the right side plate of frame are set on the support plate (32), the bottom plate (31) and two support plates (32) form a cavity to hold wire; both top and bottom ends of support plate (32) have a positioning slot respectively and a support rod (35) goes through it with both ends respectively being connected with the power source box (27) and the end cap (29).

2. The LED street lamp base according to claim 1, wherein a right end of LED lighting module (2) is set with a bulb (9) from which a lead (10) is drawn out; a left end of the LED lighting module (2) is fixed with a circular ring (7), outer circumference of the circular ring are set with elastic convex (8) for connecting with the module positioning unit.

3. The LED street lamp base according to claim 2, wherein the module positioning unit includes a clamp ring (13) that is overlapped on the circular ring (7), there is a bar (19) in middle part of clamp ring (13) and a spindle nose (20) is set on the middle part of the bar (19), a top and a bottom of inner surface of the clamp ring (13) are respectively set with a section of internal teeth (14); the elastic convex teeth (8) are geared with the internal teeth (14), the clamp ring (13) is connected with the left side plate (3) through a slide block and a sliding rail, and the periphery of clamp ring (13) is fixed on the left side plate (3), when stress act between the elastic convex teeth (8) and the internal teeth (14), the elastic convex teeth (8) is turned relative to internal teeth (14).

4. The LED street lamp base according to claim 3, wherein sliding plates (15) are set on a top and a bottom of periphery of clamp ring (13), the sliding plates (15) are parallel to each other on which a raised slide block (16) is set; the internal side of left side plate (3) is set with a cavity 17 to hold the clamp ring (13), two slide rails (18) are respectively set on a top and a bottom of the cavity 17, the slide block (16) is set in the slide rail (18).

5. The LED street lamp base according to claim 2, wherein arc slots (12) are set on both up and down edges of the right side plate (4) respectively in order to hold the bulb (9) in turn-able manner; the bulb (9) of LED lighting module (2) is set in the arc slot (12) and the lead (10) goes through the through-hole (11) and the hole (33).

6. The LED street lamp base according to claim 2, wherein the LED lighting module (2) consists of a radiator unit (22) and a heat conduction subplate (23), top of which is connected with the radiator unit (22) and bottom of which is set with a print circuit and a plurality of LED lamps (24); the circular ring (7) and the bulb (9) are respectively set on a left and a right end faces of the radiator unit (22).

7. The LED street lamp base according to claim 6, wherein the radiator unit (22) includes a baseplate (25) and a top face of the heat conduction subplate (23) is connected with a bottom face of the baseplate (25), top of the baseplate (25) is set with a plurality of fins (26) side by side; fins (26) are set along a width direction of the baseplate (25) and all of the fins (26) are vertical to the baseplate (25).

8. The LED street lamp base according to claim 7, wherein fins (26) and the baseplate (25) are made from a whole.

9. The LED street lamp base according to claim 7, wherein the elastic convex tooth (8) is made from a whole together with the circular ring (7) and both of the elastic convex tooth (8) and the circular ring (7) are made of rubber material.

10. The LED street lamp base according to claim 1, wherein the frame positioning unit includes a frame positioning plate (36) set on the outside of frame (1) and a top of the frame positioning plate (36) is hinged with the power source box (27) and the end cap (29), an end face of frame positioning plate (36) in touch with the frame is set with a plurality of parallel slots (37) from up to down along horizontal direction, at least one strip (38) matching with the slot (37) is set on the end face of the frame (1) in touch with the frame positioning plate (36), the strip (38) is set in the slot (37).

11. The LED street lamp base according to claim 10, wherein the strip (38) is set on the left side plate (3).

12. The LED street lamp base according to claim 11, wherein four parallel slots (37) are set on the frame positioning plate (36) from up to down and one strip (38) is set on a top end of the left side plate (3).

* * * * *